March 24, 1970 T. W. ELSBY 3,502,502
PROCESS FOR DEPOSITING A TANTALUM OXIDE CONTAINING COATING
Filed Jan. 5, 1967
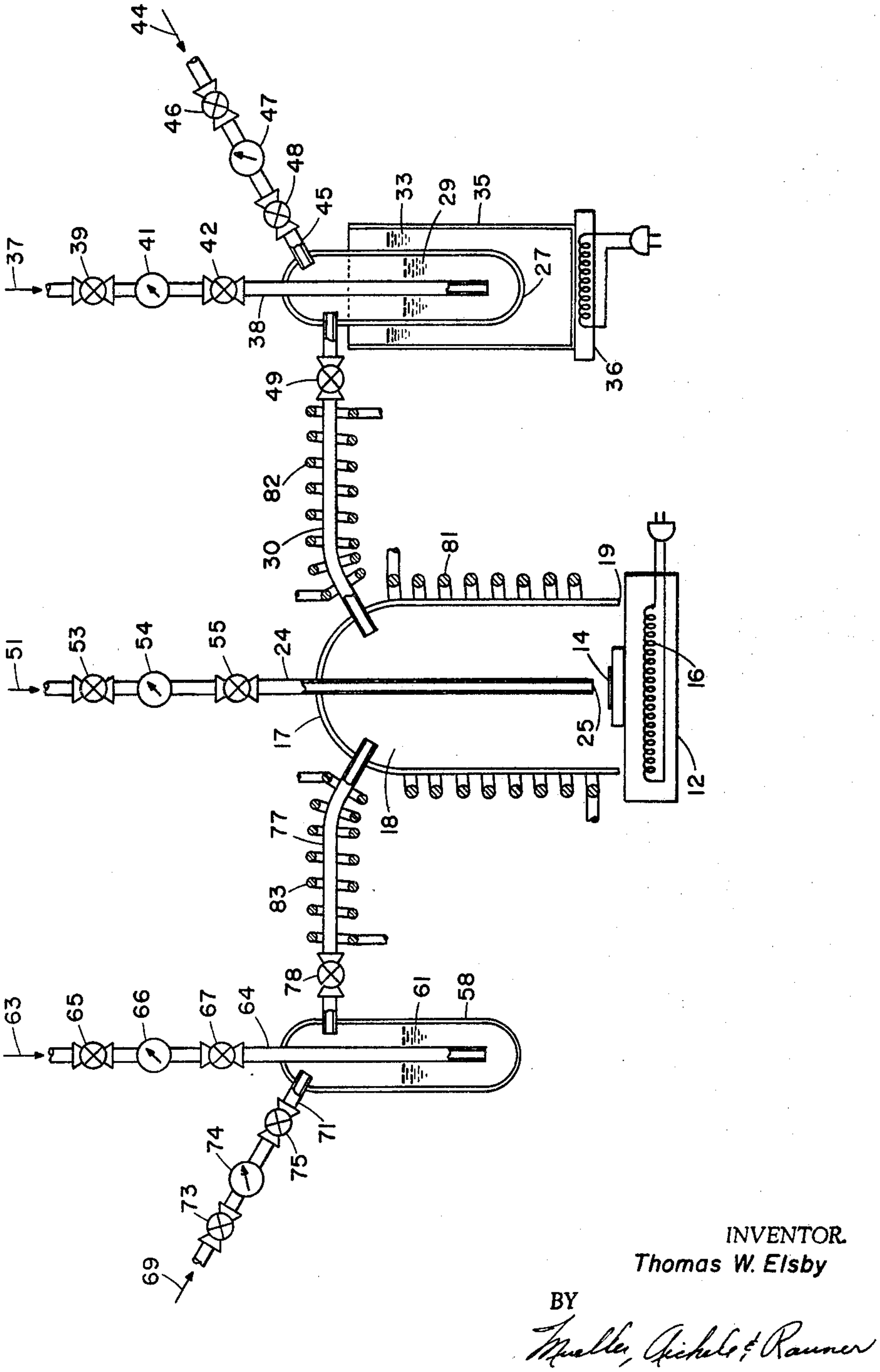
INVENTOR.
Thomas W. Elsby
BY
Mueller, Aichele & Rauner
ATTY'S.

United States Patent Office 3,502,502

Patented Mar. 24, 1970

3,502,502

PROCESS FOR DEPOSITING A TANTALUM OXIDE CONTAINING COATING

Thomas W. Elsby, Phoenix, Ariz., assignor to Motorola, Inc., Franklin Park, Ill., a corporation of Illinois Filed Jan. 5, 1967, Ser. No. 607,503

Int. Cl. B44d *1/18;* C23c *13/02*

U.S. Cl. 117—201 6 Claims

ABSTRACT OF THE DISCLOSURE

A process for depositing an oxide on a substrate. A substrate is subjected to a gaseous mixture of a volatile alkoxide and oxygen while the substrate is maintained above a minimum temperature high enough to decompose the alkoxide. Oxide combinations may be formed by introducing more than one alkoxide or other decomposable compounds, such as triethyl aluminum.

BACKGROUND OF THE INVENTION

This invention relates to an improved process for forming and depositing an oxide on a substrate. More particularly, the invention relates to a process that uses a gaseous mixture including an alkoxide of an element to form and deposit an oxide of the element on a substrate.

Oxides are formed on substrates for a variety of reasons, such as forming a chemical resist barrier, stabilizing a semiconductor device, forming a dielectric for a capacitor, etc. One example of a specific use of a metal oxide is in a capacitor for a semiconductor integrated circuit. Such a capacitor comprises a bottom and top electrode of an electrically conducting metal separated by a dielectric generally fabricated from a metal oxide. In forming a capacitor for integrated circuits, aluminum oxide is widely used as a dielectric because of its electrical properties and the ease with which it is deposited and shaped. Other metal oxides, such as tantalum oxide, are often more desirable electrically than aluminum oxide, but are not used because of the difficulty of forming oxides of these metals.

To form an oxide of a metal, such as tantalum, a process has been used in which pure metal is deposited on a substrate by evaporation or condensation. The coated substrate is then heated in an oxidizing atmosphere, generally pure or substantially pure oxygen to oxidize the metal. The oxide formed is usually not uniform and very often includes detrimental pinholes. Also, a maximum thickness is reached where the amount of oxide formed has a rate limiting effect that substantially prevents further oxidation. Additionally, the temperature and atmosphere required for the oxidation are not compatible with many substrates.

A metal layer on a substrate may also be oxidized by immersing the coated substrate in a suitable anodizing cell and biasing it electrically to anodize the metal layer. To grow a metal oxide in this manner requires an electrical conductor as a substrate or an available portion of a metal layer for electrical contact. The thickness of an oxide formed by anodization is limited in the same manner as one formed by oxidation. Also, the chemical baths used are not compatible with many substrates.

Another method of forming a metal oxide on a substrate is to heat a filament or sheet of metal in an evacuated housing in which the substrate is positioned. Oxygen is then admitted to the housing where it reacts with the heated metal to form a metal oxide. The metal oxide is in turn volatilized and deposits on the substrate in the form of a metal oxide coating. Apparatus for this process requires control of temperature and vacuum in combination with the introduction of oxygen into the system at a predetermined time. Because of the expense of such apparatus, this technique makes formation of a metal oxide expensive.

SUMMARY OF THE INVENTION

Therefore, it is an object of this invention to provide an improved process for depositing an oxide on a substrate.

Another object of this invention is to provide a process that reduces the cost and improves the quality of an oxide deposited on a substrate.

It is a further object of the invention to provide a low temperature process for depositing an oxide on a substrate.

A still further object of the invention is to provide an improved process in which an oxide of substantially any preselected thickness may be deposited on a substrate.

Another object of the invention is to provide a process of depositing an oxide on a semiconductor substrate as a portion of an integrated circuit comprising particularly a dielectric of a capacitor.

A feature of the invention is a process in which an oxide is deposited on a heated substrate utilizing a gaseous mixture of an alkoxide and oxygen.

Another feature of the invention is a process in which an oxide is deposited on a substrate at substantially atmospheric pressure.

A further feature of the invention is the formation of a metal oxide at a low temperature compatible with semiconductor integrated circuits and heat sensitive substrates.

The invention is embodied in a process for depositing an oxide of an element capable of forming a volatile alkoxide on a substrate including subjecting the substrate to a gaseous mixture comprising a volatile alkoxide of the element and oxygen while maintaining the substrate above a minimum temperature high enough to decompose the alkoxide.

BRIEF DESCRIPTION OF THE DRAWING

The invention is illustrated by the accompanying drawing, the single figure of which is a schematic diagram showing a system for depositing an oxide on a substrate in accordance with the process of the invention.

DESCRIPTION OF THE PREFERRED EMBODIMENTS

A substrate on which an oxide is deposited according to the invention advantageously comprises material capable of withstanding temperatures high enough to decompose an alkoxide utilized. Also, this material is beneficially substantially free of attack at such temperatures from the gaseous mixture utilized in the deposition. For example, substrates comprising semiconductor material, such as silicon and germanium, glass, ceramics, metals, refractory material, etc. may be utilized.

The gaseous mixture to which a substrate is subjected includes a volatile alkoxide of the element of which an oxide is to be deposited. The alkoxide for this mixture is advantageously formed of titanium, zirconium, niobium, tantalum, chromium, silicon, germanium, tin, arsenic, antimony, tellurium, thorium, etc. Alkoxides may be prepared as described in the publication by D. C. Bradley, W. Wardlaw, and (Miss) A. Whitley, J. Chemic. Soc., "Structural Chemistry of the Alkoxides," part V, 1956, 1139.

As an example, pentaethoxy tantalum is prepared by reacting ethanol and tantalum pentachloride with anhydrous ammonia in dry benzene. The resulting pentaethoxy tantalum is a colorless liquid having a vapor pressure of about ten millimeters at about 200° C. and is fairly stable thermally but readily decomposed by water.

Alkoxides generally have a low vapor pressure at room temperature. Therefore, alkoxides are advantageously heated to raise their vapor pressure and aid in formation of a gaseous mixture for use in depositing an oxide. For the pentaethoxy tantalum previously described, the liquid is heated to a temperature between about 185° and 202° C. while contained in a saturator. Vapors are formed by passing an unreactive carrier gas through the heated liquid in the saturator. An unreactive carrier gas is one that does not react with compounds present in the system during the deposition. For example, gases such as argon, nitrogen and helium may be used as a carrier gas.

Apparatus suitable for depositing an oxide according to the invention includes a hot plate 12 (FIG. 1) shown in a raised position, on which a substrate 14 is shown positioned. Hot plate 12 is heated by an electrical resistance coil 16. A reactor 17, defining a reaction chamber 18, is placed over hot plate 12 and substrate 14. Reactor 17 may be a quartz bell jar or a similar container having an edge 19 defining a large opening at one end. Edge 19 is located close to the surface of hot plate 12 on which substrate 14 is positioned. Advantageously, hot plate 12 is movable to a lowered position removed from edge 19 of reactor 17. Oxygen is introduced to reaction chamber 18 through an inlet pipe 24 that extends a substantial distance into reactor 17 to a termination point 25 close to substrate 14.

A gaseous mixture formed in a saturator 27, that includes a quantity of a liquid alkoxide 29 which includes the element to be deposited as an oxide, is introduced to reaction chamber 18 through inlet pipe 30. Saturator 27 is immersed in a constant temperature bath 33 so that alkoxide 29 is below the surface of bath 33. Bath 33 is contained in a vessel 35 and maintained at a preselected temperature by a heat source 36, shown as a hot plate.

An unreactive carrier gas from a source 37 is introduced below the surface of alkoxide 29 through a pipe 38. The flow of unreactive carrier gas from source 37 is regulated by a control valve 39, a flow meter 41, and a shut-off valve 42. Further dilution of the gaseous mixture is provided by a second flow of an unreactive carrier gas from a source 44, introduced to saturator 27 through a pipe 45. The dilution stream is regulated by a control valve 46, a flow meter 47 and a shut-off valve 48. The gaseous mixture from saturator 27 flows through inlet pipe 30 and is regulated by a shut-off valve 49.

Oxygen, introduced to reaction chamber 18 through pipe 24, flows from a source 51 and is regulated by a control valve 53, a flow meter 54 and a shut-off valve 55.

In this apparatus, a second saturator 58 is provided that may contain a liquid 61 including a second material to be included in the oxide deposited on substrate 14. An unreactive carrier gas from a source 63 is introduced below the surface of liquid 61 through a pipe 64. The flow of gas from source 63 is regulated by a control valve 65, a flow meter 66 and a shut-off valve 67. Additional dilution is provided from a source 69 of unreactive carrier gas that is introduced to saturator 58 through a pipe 71. The flow of carrier gas from source 69 is regulated by a control valve 73, a flow meter 74 and a shut-off valve 75. The gaseous mixture from saturator 58 is introduced to reaction chamber 18 through an inlet pipe 77 and is regulated by a valve 78.

Heating coils 81, 82 and 83 are respectively provided about reactor 17, pipe 30 and pipe 77. Heat from these coils prevents condensation of the gaseous compounds on the walls of reactor 17 and pipes 30, 77 prior to the deposition of the metal oxide.

In the deposition of a metal oxide, such as tantalum oxide, utilizing the above-described apparatus, liquid pentaethoxy tantalum is heated in a saturator to a temperature between about 185° and 202° C. An unreactive carrier gas, such as argon, is introduced below the surface of the heated pentaethoxy tantalum at a flow between six and 130 cubic centimeters per minute. A diluting stream of argon is introduced into the saturator above the liquid at a flow rate between about 175 and 350 cubic centimeters per minute. The resulting gaseous mixture is introduced into the reactor.

Oxygen is also introduced into the reactor over the heated substrate at a flow rate between abount ten and 200 cubic centimeters per minute.

The substrate is maintained at a minimum temperature above the decomposition temperature of the pentaethoxy tantalum. Advantageously, the substrate temperature is between about 275° and 600° C., and preferably between about 425° and 475° C. Metal oxide is deposited on the substrate and by-products of the reaction, along with excess gaseous mixture, flow out of the reactor through the space between the reactor edge and the hot plate. These by-products and excess gases are removed by a venting system.

An improved dielectric particularly for use with semiconductor integrated circuits may be formed by introducing a gaseous mixture including triethyl aluminum into the reaction chamber with the gaseous mixture of oxygen and pentaethoxy tantalum. This gaseous mixture of triethyl aluminum is advantageously formed by passing an unreactive gas, such as argon, through liquid triethyl aluminum at a flow rate between about 17 and 340 cubic centimeters per minute. A metal oxide coating including the tantalum oxide and aluminum oxide is deposited on the heated substrate using this gaseous mixture.

The following examples illustrate specific embodiments of the invention, although it is not intended the examples restrict the scope of the invention.

EXAMPLE I

The above-described apparatus was employed for depositing a layer of tantalum oxide on a plurality of silicon wafers or substrates that had been prepared for the formation of a capacitor by a vacuum deposition of aluminum for a lower plate on one surface thereof. The hot plate, in a lowered position, was heated to a temperature of about 450° C. Pentaethoxy tantalum was placed in the saturator and the saturator immersed in an oil bath with the pentaethoxy tantalum completely under the surface of the oil. The oil bath was stabilized at a temperature of about 185° C. The heating coils about the inlet pipes and the reactor were heated to a temperature of about 300° C.

Argon gas was flowed through the pentaethoxy tantalum at about 13 cubic centimeters per minute and a diluting stream of argon was flowed through the saturator over the pentaethoxy tantalum at a rate of about 350 cubic centimeters per minute. The resulting gaseous mixture of argon and pentaethoxy tantalum was flowed through the heated inlet pipe into the reactor. Oxygen from a source was flowed into the reactor at a rate of about 21 cubic centimeters per minute. The reactor was a quartz bell jar about two inches in diameter and about eight inches high.

The previously prepared wafers were placed on the hot plate in the lowered position and heated to a temperature of about 450° C. After the wafers were heated, the hot plate was moved to the raised position. The hot plate was retained in the raised position for about four minutes. With the hot plate in the raised position the inlet for the oxygen terminated about three inches above the wafers.

The hot plate was lowered and the wafers were removed. The wafers were inspected with an interferometer. A layer of tantalum oxide about 1000 A. thick had been deposited on each of the wafers.

The wafers were further processed to form the upper plates for the capacitors and the layers shaped to form capacitors of preselected size.

The electrical parameters of the capacitors were tested and found to be as follows:

Dielectric constant ($k$) 1$c$—25.
Capacitance change from −50° to 85° C.—±3%.

Usable capacitance per unit area (maximum)—1.5 to 2.0 pf./mil$^2$.
Voltage breakdown (DC) of 1.5 pf.mil$^2$—8 to 10 volts.
Dissipation factor—0.1 to 0.5%.

EXAMPLE II

The procedure of this example was the same as that of Example I except for the following: A quantity of liquid triethyl aluminum was placed in a second saturator and maintained at a temperature of about 20° C. or room temperature. Argon gas was flowed through the liquid at a rate of about 34 cubic centimeters per minute to form a gaseous mixture of argon and vapors of triethyl aluminum. The resulting gaseous mixture was flowed through an inlet pipe to the reaction chamber and mixed with the pentaethoxy tantalum and oxygen. The wafers were subjected to this gaseous mixture for about three minutes.

Prior to the formation of the upper plate, the wafers were examined with an interferometer and it was found that an oxide layer about 1000 A. thick had been deposited on each wafer.

The electrical parameters of the capacitors were tested and found to be as follows:

Dielectric constant ($k$)—23.
Capacitance change −50° to 85° C.—±5%.
Usable capacitance per unit area (maximum)—1.5–2.0 pf./mil$^2$.
Voltage breakdown (DC) of:
1.5 pf./mil$^2$—10–15 volts.
2.0 pf./mil$^2$—6–10 volts.
Dissipation factor—.05–.5%.

The above description, drawings and examples show that the present invention provides a novel process that uses a gaseous mixture including an alkoxide of an element to form and deposit an oxide of the element on a substrate. Also, the invention provides a process for depositing an oxide at a reduced cost having improved qualities. Additionally, this deposition is performed at a low temperature and substantially atmospheric pressure. The oxide may be formed to a preselected thickness using the process of the invention and a metal oxide may be formed particularly suited for use as a dielectric of a capacitor.

I claim:

1. A process for depositing tantalum oxide on a substrate comprising the steps of subjecting said substrate to a gaseous mixture comprising a volatile tantalum alkoxide and oxygen while maintaining said substrate at a temperature sufficiently high enough to decompose said alkoxide into tantalum oxide.

2. A process according to claim 1 in which said substrate comprises silicon.

3. A process according to claim 1 in which a portion of said substrate on which said oxide is deposited comprises an electrically conductive layer.

4. A process according to claim 1 in which said temperature is between about 275° and 600° C.

5. A process according to claim 1 in which said alkoxide comprises a liquid and said gaseous mixture includes an unreactive carrier gas having a first portion flowing through said liquid at a rate between about six and 130 cubic centimeters per minute forming a gaseous admixture being combined with a second portion of said unreactive carrier gas flowing at a rate between about 175 and 350 cubic centimeters per minute.

6. A process according to claim 1 in which a gaseous mixture comprising an unreactive carrier gas and triethyl aluminum is combined with said gaseous mixture of said alkoxide and oxygen prior to subjecting said mixture to said temperature.

References Cited

UNITED STATES PATENTS

| | | | |
|---|---|---|---|
| 2,831,780 | 4/1958 | Deyrup | 117—106 |
| 2,989,421 | 6/1961 | Novak | 117—106 |
| 3,304,200 | 2/1967 | Statham | 117—201 |
| 3,330,694 | 7/1967 | Black et al. | 117—201 |
| 3,356,703 | 12/1967 | Mazdiyasni et al. | 117—106 |

OTHER REFERENCES

Bradley et al., Journal of the Chemical Society, 1956, pp. 1139 to 1142 relied upon.

Powell et al., Vapor Deposition, Mar. 10, 1966, pp. 384 to 389, 391 to 395 and 400 to 403 relied upon.

ANDREW G. GOLIAN, Primary Examiner

U.S. Cl. X.R.

117—106